W. H. FLETCHER.
LAWN MOWER.
APPLICATION FILED JULY 20, 1920.
1,437,508.                    Patented Dec. 5, 1922.
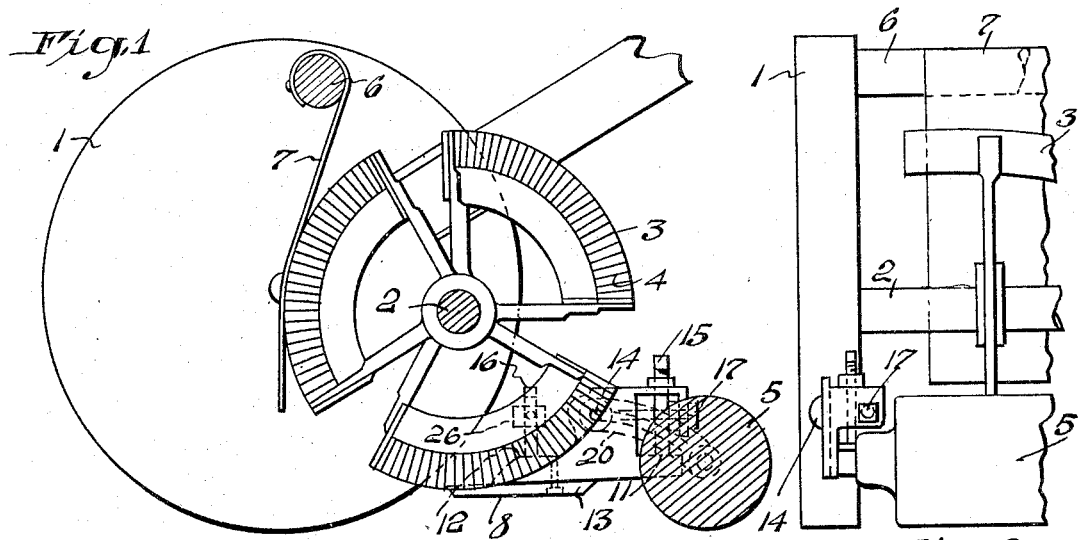
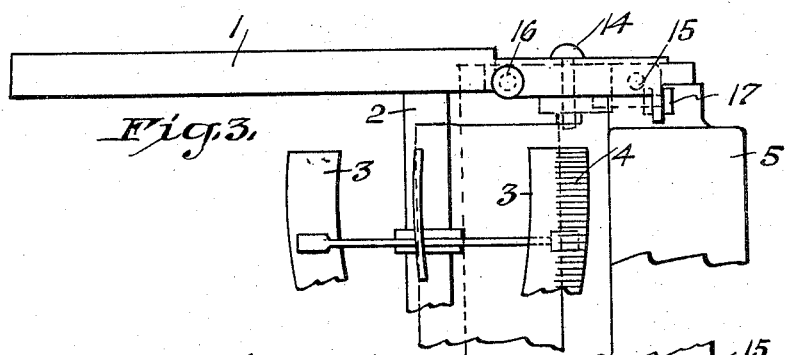
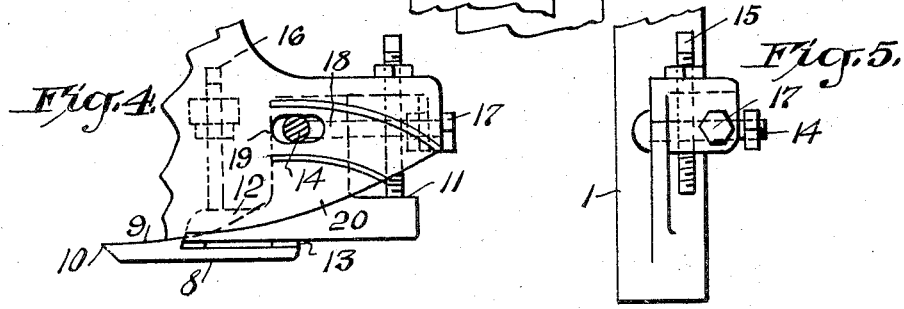
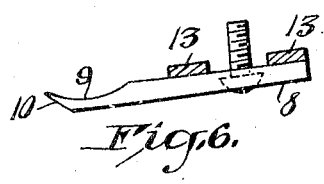
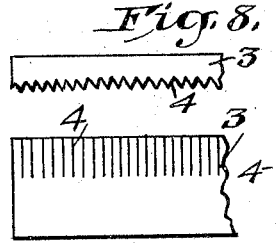
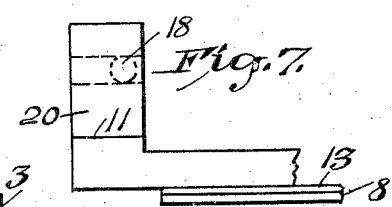
Inventor:
William H Fletcher
By J Irving Terhune Patented Dec. 5, 1922.

1,437,508

UNITED STATES PATENT OFFICE.

WILLIAM H. FLETCHER, OF PATERSON, NEW JERSEY.

LAWN MOWER.

Application filed July 20, 1920. Serial No. 397,702.

*To all whom it may concern:*

Be it known that I, WILLIAM H. FLETCHER, a citizen of the United States, and resident of Paterson, in the county of Passaic and State of New Jersey, have invented certain new and useful Improvements in Lawn Mowers, of which the following is a specification.

This invention relates to improvements in lawn mowers, and has for its objects the keen cutting of grass by its tendency to draw the grass in contact with the blades, the means for adjusting the lower knife, and of sharpening the blades and lubricating the same. I attain these results by the mechanism as illustrated in the accompanying drawings.

In ordinary lawn mowers the tendency is to roll the grass down if the grass is over a certain length. The blades constantly lose their keenness through rust. The lower knife is rigid and has no forward, backward or vertical adjustment so that the angle of maximum efficiency can be retained.

In this invention these defects have been overcome as will be shown.

In the drawings Fig. 1 is an end section of the lawn mower with the improvements on same.

Fig. 2 is a side view of one end of Fig. 1. Fig. 3 is a plan of the same. Fig. 4 is a detail of the knife adjustment.

Fig. 5 is a view of a part of the frame of the machine which holds the knife holder. Fig. 6 is an end view of the blade. Fig. 7 is a view of the piece supporting the blade with the blade in position. Fig. 8 is a front view of the blade. Figs. 9 and 10 are two views of Fig. 8.

In the drawings similar numerals refer to similar parts throughout the several views.

The driving wheel 1 is the same as in all the ordinary machines. The revolving knives 3 have cuts in their faces 4 forming a hook shape like a mill file as shown in Figs. 8, 9 and 10.

The blades 3, thus cut, when revolved come in contact with the blades of grass drawing them in the machine, and when the grass is long the revolving cutters will hook the said blades of grass and bend them double and cut them the required length.

The edge 10 of the knife 8 is a little in advance of the center line of the cylinder shaft 2 and is mounted on the bottom of the holder 20 and has rubber or other yielding liners 13 between it and said holder 20, so that the knife can have a slight vertical yield.

The holder 20 pivots on the bolt 14 when the nut on said bolt is loosened. The holder 20 can then be adjusted laterally in the slot 19 in the frame of the machine, by means of the screw stud 17 tapped in the holder 20 at 18.

The knife 8 also has a vertical adjustment by means of the two screw studs 15 and 16 and are held by locknuts on each. When adjusted the bolt 14 is screwed tight.

The knife 8 has a hollow 9 at its cutting edge 10, which conforms to the shape of the revolving cylinder knives and is in close contact with the same.

When it is necessary to sharpen the knives, the knife 8 is elevated slightly and powdered emery and oil are placed on the hollow portion 9 of the knife 8 and the cylinder with the knives is revolved backwards which will grind the knives.

The knives are lubricated by a piece of oil saturated fabric 7 supported on the distance rod 6 and hanging down far enough to constantly and lightly touch the blades 3 while revolving. This keeps the blades from rusting and keeps them keen and also cutting more easily.

Having described my invention what I claim and desire to secure by Letters Patent is:

1. In a lawn mower, a rotary reel having cutting blades thereon, said blades being provided with tooth cuts in the blade surface along the cutting edge thereof.

2. In a lawn mower, a rotary cutting reel and a fixed ledger blade cooperating therewith, blades on said cutting reel provided with tooth cuts along the cutting edge thereof, and means for adjusting said fixed ledger blade vertically and horizontally so as to bring said cooperating blades into advantageous shearing relation to each other.

Signed at Paterson in the county of Passaic and State of New Jersey, July A. D. 1920.

WILLIAM H. FLETCHER.

Witnesses:
H. I. TERHUNE,
S. I. TERHUNE.